United States Patent [19]

Sugiura

[11] 4,134,542
[45] Jan. 16, 1979

[54] THERMOPNEUMATIC ACTUATOR

[75] Inventor: Hiroyuki Sugiura, Konan, Japan

[73] Assignee: Diesel Kiki Company, Ltd., Tokyo, Japan

[21] Appl. No.: 843,545

[22] Filed: Oct. 19, 1977

[30] Foreign Application Priority Data

Oct. 21, 1976 [JP] Japan .................... 51-126443

[51] Int. Cl.² .............................................. B60H 1/02
[52] U.S. Cl. ........................................ 236/13; 236/87; 236/91 F
[58] Field of Search ............... 237/12.3 B; 236/87, 236/91 F, 80 C, 13; 165/42, 43

[56] References Cited

U.S. PATENT DOCUMENTS

| 3,727,837 | 4/1973 | Gazzera et al. | 236/87 |
| 3,770,195 | 11/1973 | Franz | 236/87 |
| 3,877,638 | 4/1975 | Amano et al. | 236/87 |

Primary Examiner—William E. Wayner
Attorney, Agent, or Firm—David G. Alexander

[57] ABSTRACT

An output member of the present actuator is connected to control a temperature door in an air conditioning duct leading into an automobile passenger compartment and thereby the temperature in the compartment. The output member is connected to and moved by a diaphragm which is positioned by opposing forces of a diaphragm spring and modulated intake manifold vacuum. A valve is controlled by first and second bimetal springs which act in parallel against a feedback spring connected between the valve and the diaphragm. The first bimetal spring is responsive to air temperature in the compartment. The second bimetal spring is responsive to air temperature in the duct and compensates for variations in the operation of the air conditioning system caused by variations in load and the like.

10 Claims, 7 Drawing Figures

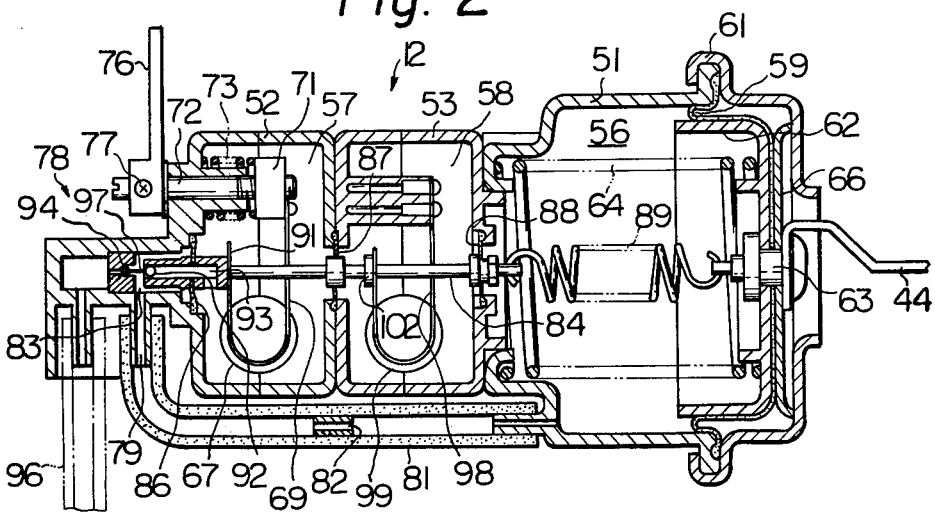
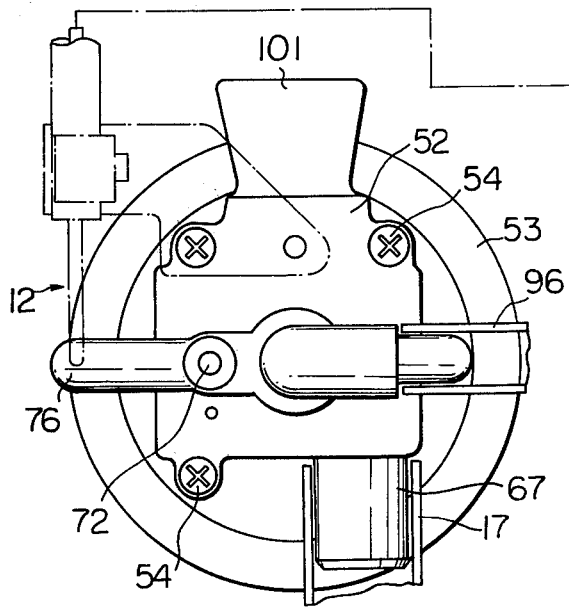
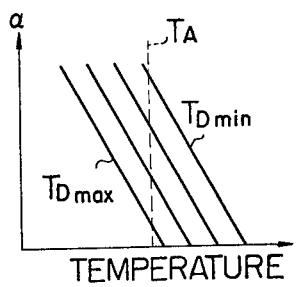

THERMOPNEUMATIC ACTUATOR

BACKGROUND OF THE INVENTION

The present invention relates to a thermopneumatic actuator especially suited for controlling the temperature in the passenger compartment of an automotive vehicle.

Passenger automobiles and trucks are normally provided with heating and cooling systems for maintaining the desired temperature in the vehicle passenger compartment. The temperature is controlled by selectively energizing the heating and cooling systems and furthermore by positioning a temperature door which controls the mixture of hot and cold air.

The temperature door is generally positioned by means of a vacuum actuator which is fed with modulated vacuum from the vehicle intake manifold. The actuator typically comprises a diaphragm which is positioned by opposing forces of the modulated vacuum and a diaphragm spring. The vacuum actuator may be provided with a power diaphragm and a pilot diaphragm to increase the accuracy and decrease the effects of variations in the mechanical resistance encountered in moving the temperature door.

The vacuum to the actuator is modulated by means of a thermally controlled valve. A bimetal spring exposed to air from the passenger compartment positions a valve element to bleed air into the vacuum actuator and thereby reduce the vacuum as a function of temperature. Such a thermally controlled valve is generally referred to in the art as a thermostatic vacuum regulator.

A system of this type is an open loop control system since there is no mechanical feedback between the diaphragm and the valve. Thus, the system is inherently inaccurate since such factors such as variations in the vacuum applied to the regulator, ageing of the diaphragm, pressure drops between the regulator and the actuator and the like will cause the temperature to be controlled in an erratic manner. In addition, the system is disadvantageous from an installation standpoint since the regulator and actuator are separate units. They must be mounted in separate locations and connected by a conduit, constituting unnecessary consumption of mounting space, installation time and expense.

Yet another drawback of such a prior art system is a major cause of poor temperature regulation. The operation of heaters and coolers in automotive air conditioning systems tends to vary in response to engine speed, load, cyclic operation of the cooler compressor and similar factors. Thus, with temperature door positioned as a function only of temperature in the compartment, the temperature of the air being fed into the compartment may vary substantially. Due to the long response time inherent in such a system, the result is erratic operation.

SUMMARY OF THE INVENTION

The present invention overcomes the problems described hereinabove by providing a feedback spring between the modulator valve element and the diaphragm and a second bimetal spring responsive to the temperature in the air conditioning duct leading into the passenger compartment. The two bimetal springs act in parallel against the force of the feedback spring to position the valve element.

It is an object of the present invention to provide a thermopneumatic actuator especially suited for a vehicle air conditioning system which provides effective temperature control.

It is another object of the present invention to provide an actuator which is uneffected by variations in output load.

It is another object of the present invention to provide an actuator which compensates for variations in the output of air conditioning system elements.

It is another object of the present invention to provide a generally improved thermopneumatic actuator.

Other objects, together with the foregoing, are attained in the embodiments described in the following description and illustrated in the accompanying drawing.

BRIEF DESCRIPTION OF THE DRAWING

FIG. 2 is an overhead sectional view of the actuator;

FIG. 3 is a rear elevation of the actuator;

FIG. 4 is a graph illustrating the operation of the actuator;

DESCRIPTION OF THE PREFERRED EMBODIMENTS

Figure 1:
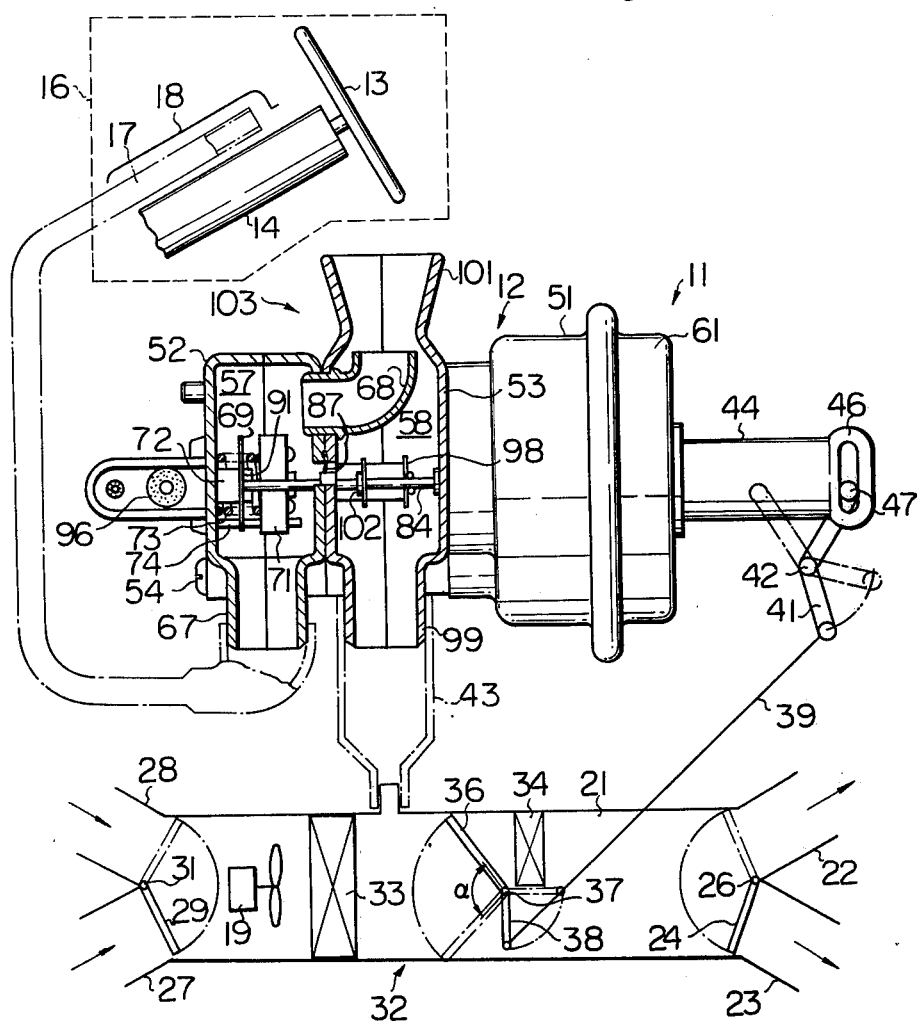
FIG. 1 is a schematic side elevation, partially in section, of a vehicle air conditioning system comprising a thermopneumatic actuator of the present invention.

While the thermopneumatic actuator of the invention is susceptible of numerous physical embodiments, depending upon the environment and requirements of use, substantial numbers of the herein shown and described embodiments have been made, tested and used, and all have performed in an eminently satisfactory manner.

Referring now to the drawing, a vehicle air conditioning system embodying the present invention is generally designated as 11 and comprises a thermopneumatic actuator 12. A steering wheel 13 is supported by a steering column 14 in a passenger compartment 16 of a motor vehicle such as an automobile or truck (not shown). A hose 17 having an upper end shrouded by a cowling 18 adjacent to the steering wheel 13 leads to the actuator 12.

A fan or blower 19 is provided in an air conditioning duct 21 to force air therethrough into the passenger compartment 16, although the connection is not illustrated, by means of an upper outlet 22 and a lower outlet 23. The relative proportion of air passing through the outlets 22 and 23 is controlled manually by means of a damper or control door 24 which is pivotal about a shaft 26.

In a similar manner air from the passenger compartment 16 may be introduced into the duct 21 through an inlet 27. Outside air may also be introduced into the duct 21 through an inlet 28. A damper 29 controls the proportion of air passing through the inlets 27 and 28 and is pivotal about a shaft 31.

An air conditioning apparatus provided in the duct 21 is generally designated as 32 and comprises a cooler evaporator 33, a heater 34 and a temperature control door 36 which is pivotal about a shaft 37. A link 38 is integral with the door 36 and is connected to the actuator 12 through a connecting link 39 and a bellcrank lever 41 which is pivotal about a pin 42. The actuator 12 is connected to the duct 21 through a hose 43.

A control member in the form of a rod or bar 44 of the actuator 12 is formed with a transverse slot 46 in which is slidably received a pin 47 connected to the upper end of the bellcrank lever 41. As is apparent from examination of FIG. 1 the connecting link 39 is connected to the lower end of the bellcrank lever 41.

Prior to describing the detailed configuration and operation of the actuator 12, the overall operation of the system 11 will be described. Due to an aspiration effect which will be described below, air blown from the duct 21 through the actuator 12 by means of the hose 43 causes air to be sucked through the actuator 12 from the passenger compartment 16 through the hose 17. The temperature of the air flowing through the hose 17 is sensed and the axial position of the rod 44 is controlled in accordance with the sensed temperature.

As shown in FIG. 3, an indicator 48 is provided in the passenger compartment 16 and connected to the actuator 12 through a cable 49 by which the vehicle driver sets the desired compartment temperature. If the temperature rises above the desired value as sensed by the actuator 12, the rod 44 is extended or moved rightwardly as viewed in FIG. 1. This causes the bellcrank lever 41 to pivot clockwise and the door 36 also to pivot clockwise thereby further blocking the heater 34. This movement has the further effect of uncovering the space (not designated) between the lower end of the heater 34 and the lower wall of the duct 21. Thus, cool air flowing from the evaporator 33 bypasses the heater 34 and the temperature in the passenger compartment 16 is lowered to the desired value. The door 36 is movable from a fully closed position shown in solid line to a fully open position shown in phantom line, with the angle of opening being designated as $\alpha$. Exactly the opposite effect occurs if the sensed temperature decreases below the desired value set in by the indicator 48.

In parallel with the operation of sensing the temperature in the passenger compartment 16, the temperature of the air flowing from the duct 21 through the hose 43 into the actuator 12 is also sensed. Due to the cyclic operation of the cooling system, variations in the output of the evaporator 33 and heater 34 caused by variations in engine load and the like, the temperature of the air in the duct 21 varies independently of the temperature in the passenger compartment 16. In prior art systems of comparable type, these variations cause erratic operation of the system. However, the present invention overcomes this problem by sensing the air temperature in the duct 21 and controlling the door 36 to compensate for such variations. If the temperature in the duct 21 increases, the actuator 12 moves the door 36 clockwise to reduce the temperature of air introduced from the duct 21 into the passenger compartment 16. In response to a decrease in temperature, the opposite effect occurs.

This operation is illustrated in FIG. 4. The abscissa axis represents the sensed temperature in the passenger compartment 16 and the ordinate axis represents the opening angle $\alpha$ of the door 36. It will be noted that as the sensed compartment temperature increases the door 36 is progressively closed.

The various curves in FIG. 4 illustrate the effect of sensing the temperature $T_D$ in the duct 21. As the duct temperature increases from a minimum value $T_{D_{min}}$ to a maximum value $T_{D_{max}}$ the curve is progressively shifted leftwardly. At an exemplary value of passenger compartment temperature designated as $T_A$, the temperature control door 36 is almost completely closed at $T_{D_{max}}$ and almost completely open at $T_{D_{min}}$.

The detailed construction and operation of the actuator 12 will now be described with reference being made to FIGS. 1 to 3.

The actuator 12 comprises a diaphragm housing 51, a first valve housing 52 and a second valve housing 53 which are connected together by screws 54, with the second valve housing 53 being disposed between the first valve housing 52 and the diaphragm housing 51. The housings 51, 52 and 53 define therein a pressure chamber 56, a first temperature chamber 57 and a second pressure chamber 58 respectively.

The right wall of the pressure chamber 56 is constituted by a flexible power diaphragm 59 which is fixed at its periphery to the right edge of the housing 51 by an annular cap 61. A spring retainer cap 62 is fixed to the center of the diaphragm 59 by a pin 63. A diaphragm spring 64 is compressed between the left end of the housing 51 and the cap 62, thereby urging the cap 62 and diaphragm 59 rightwardly. The pin 63 also fixes the rod 44 and a cap 66 to the right side of the diaphragm 59 so that the diaphragm 59 and rod 44 move in an integral manner.

The temperature chamber 57 has an inlet 67 connected to the hose 17 and an outlet tube 68. Due to the aspiration effect, air from the passenger compartment 16 is caused to flow through the temperature chamber 57 by venturi action as will be described below.

A generally U-shaped bimetal spring 69 is fixedly supported at its lower or right end by a block 71, which is in turn supported by a bolt 72 which threadingly passes therethrough. The bolt 72 is rotatably supported through the left wall of the housing 52 and extends externally therefrom. A compression spring 73 is disposed between the left wall of the housing 52 and the block 71 to take up lost motion and dampen vibration. A rod 74 extends from the left wall of the housing 52 and slidingly passes through the block 71 thereby aiding in the support of the block 71 and preventing rotation thereof.

An arm 76 is fixed to the bolt 72 by means of a setscrew 77. The cable 49 is connected to the end of the arm 76. Tension or slackening of the cable 49 caused by adjustment of the indicator 48 causes the arm 76 and bolt 72 to rotate and the block 71 to move left or right as viewed in FIGS. 1 and 2 carrying the spring 69 therewith.

A vacuum modulator valve which is generally designated as 78 is provided to the housing 52 and comprises an outlet 79 which communicates with the pressure chamber 56 through a tube 81. A flow restriction 82 is provided in the tube 81. The outlet 79 leads from a valve chamber 83 defined within the housing 52.

A valve element 84 is supported by flexible diaphragms 86, 87 and 88 which hermetically seal the chambers 56, 57 and 58 from each other and allow the valve element 84 to move axially. While the diaphragms 86 and 88 are equal in area, the diaphragm 86 may be made slightly larger than the diaphragm 88. The right end of the valve element 84 is connected to the pin 63 through a valve or feedback spring 89. The upper or left end portion of the bimetal spring 69 resiliently engages with a shoulder 91 of the valve element 84 and urges the same leftwardly.

The left end of the valve element 84 is formed with an inlet valve seat 92 which communicates with the interior of the temperature chamber 57 through a passageway 93. Another inlet valve seat 94 communicates with a hose 96 leading from the vehicle intake manifold (not shown). A double headed valve element 97 is supported by the valve element 84. More specifically, the valve element 97 has a left ball (not designated) which closes the valve seat 94 when moved leftwardly into engagement therewith. The valve element 97 further has a right ball which is disposed to the right of the valve seat 92 inside the passageway 93 and blocks the same when the valve element 97 is moved rightwardly.

A second U-shaped bimetal spring 98 is disposed in the second temperature chamber 58. The chamber 58 has an inlet 99 connected with the hose 43 and an outlet tube 101 which is constricted to constitute a venturi and coaxially surrounds the opening of the tube 68. Both tubes 68 and 101 open to the atmosphere. The upper end of the spring 98 is fixed to the wall of the housing 53 and the lower end of the spring 98 urges the valve element 84 leftwardly through a land 102 formed on the valve element 84.

Pressurized air from the duct 21 is forced through the hose 43, temperature chamber 58 and tube 101 and acts on the spring 98. Air discharged from the tube 101 creates a low pressure area at the venturi portion which sucks air from the passenger compartment 16 through the hose 17 and temperature chamber 57 out the tube 68. The air passing through the temperature chamber 57 acts on the spring 69. The tubes 68 and 101 constitute an aspirator which is designated as 103.

In operation, the vehicle driver rotates the indicator 48 to set the desired temperature. This causes rotation of the bolt 72 and adjustment of the preload of the spring 69 against the shoulder 91 of the valve element 84. The spring 69 is compressed inwardly, and exerts a leftward force on the valve element 84, as does the spring 98. The valve spring 89 exerts a rightward force on the valve element 84. Then, although leftward and rightward forces exert on the diaphragms 86 and 88 respectively, these forces are counterbalanced each other because the diaphragm 86 are equal in area to the diaphragm 88, as mentioned above. Accordingly, the valve element 84 is not affected by these forces, but is affected by both the leftward forces of the springs 69 and 98 and the rightward force of the spring 89 so as to be positioned. An increase in temperature in the temperature chamber 57, which corresponds to the passenger compartment temperature, causes the spring 69 to thermally deform leftwardly and exert a greater force on the valve element 84 against the force of the spring 89. The valve element 84 is positioned when the forces of the springs 69, 98 and 89 thereon are equal. When the sensed temperature corresponds to the desired temperature, the valve element 84 attains an equilibrium position shown in FIG. 2 whereby the left and right balls of the valve element 97 block the valve seats 92 and 94 respectively. This seals the valve chamber 83 and thereby blocks communication between the pressure chamber 56, the temperature chamber 57 which is at atmospheric pressure and the hose 96 which conducts vacuum to the valve seat 94 from the intake manifold. Under equilibrium conditions, the vacuum in the pressure chamber 56 urging the diaphragm 59 leftwardly.

When the temperature in the passenger compartment 16 exceeds the desired temperature the spring 69 thermally deforms or expands leftwardly, thereby moving the valve element 84 leftwardly. The left ball of the valve element 97 abuts against the valve seat 94, blocking the same. The valve element 84 overtravels the valve element 97 with the result that the right ball of the valve element 97 unblocks the valve seat 92 thereby establishing communication between the temperature chamber 57 and the valve chamber 83 through the passageway 93.

This has the further effect of connecting the temperature chamber 57 to the pressure chamber 56 through the valve chamber 83 and tube 81, causing air at atmospheric pressure to bleed into the pressure chamber 56 reducing the level of vacuum. As a result, the spring 64 overcomes the force exerted on the diaphragm 59 by the vacuum in the pressure chamber 56 and moves the diaphragm 59 rightwardly. The rod 44 moves with the diaphragm 59, moving the temperature control door 36 toward the closed position to reduce the temperature of air being forced through the duct 21 into the passenger compartment 16.

Rightward movement of the diaphragm 59 extends the valve spring 89 thereby increasing the rightward force thereof on the valve element 84 in opposition to the leftward forces of the bimetal springs 69 and 98 in parallel. The diaphragm spring 64 is designed to be much stiffer than the valve spring 89 so that the spring 89 has essentially no effect on the spring 64. The valve element 84 is moved rightwardly until the force of the spring 89 equals the forces of the springs 69 and 98. At this point, which is the equilibrium position, the right ball of the valve element 97 closes the valve seat 92 and seals the pressure chamber 74.

The opposite effect occurs when the temperature drops below the desired value. The leftward force of the spring 69 on the valve element 84 is decreased and the spring 89 pulls the valve element 84 rightwardly. Due to the arrangement of the right ball of the valve element 97 and the valve seat 92, the valve element 97 is pulled rightwardly by the valve element 84 and the left ball of the valve element 97 unblocks the valve seat 94. This connects the pressure chamber 56 to the intake manifold through the tube 96, valve chamber 83, valve seat 94 and hose 81. Thus, air is sucked out of the pressure chamber 56 increasing the level of vacuum.

As a result, the diaphragm 59 and rod 44 are pulled leftwardly to further open the temperature control door 36. The spring 89 is slackened by the rightward movement of the diaphragm 59 and the force thereof on the valve element 84 decreases. The valve element 84 is moved leftwardly by the spring 69 until the spring forces are equal and the left ball of the valve element 97 seats against the valve seat 94 to seal the pressure chamber 56.

The spring 98 acts on the valve element 84 in exactly the same manner as the spring 69, but in response to air temperature in the duct 21. In response to an increase in duct temperature caused by, for example, a reduction in engine load, the spring 98 moves the valve element 84 leftwardly to close the door 36. In response to a decrease in duct temperature caused by, for example, low temperature engine operation, the spring 98 moves the valve element 84 rightwardly to close the door 36. The springs 69 and 98 are connected to the valve element 84 mechanically in parallel, and the force acting against the feedback spring 89 is equal to the sum of the forces of the springs 69 and 98.

In summary, it will be seen that the rod 44 is positioned by the diaphragm 59 as a function of the level of vacuum or negative gage pressure in the pressure chamber 56. The level of vacuum is determined by the valve 78 which is operated by the bimetal springs 69 and 98. Mechanical feedback from the diaphragm 59 to the valve 78 is provided by the feedback or valve spring 89 which provides closed loop control. Thus, the above mentioned drawbacks of the prior art are overcome and the present system 11 operates with extremely improved precision. Various obvious modifications to the actuator 12 such as replacing the double headed ball valve element 97 with a sleeve or functionally equivalent valve arrangement and operating the diaphragm assembly with positive gage pressure rather than vacuum such as from a Diesel engine supercharger will become immediately apparent to one skilled in the art.

While the diaphragms 86 and 88 are equal in area, the diaphragm 86 may be made slightly larger than the diaphragm 88.

Figure 5:
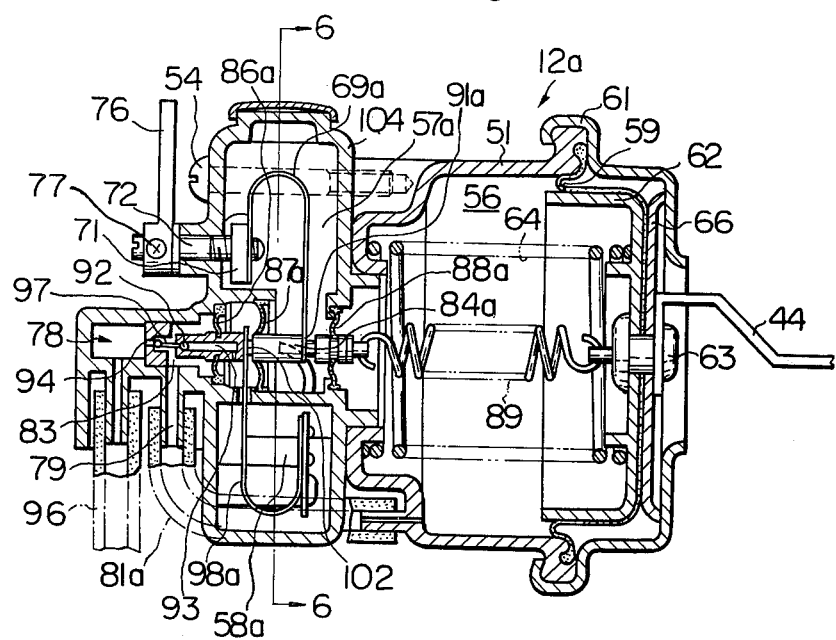
FIG. 5 is a sectional elevation of a second embodiment of the present actuator.
Figure 6:
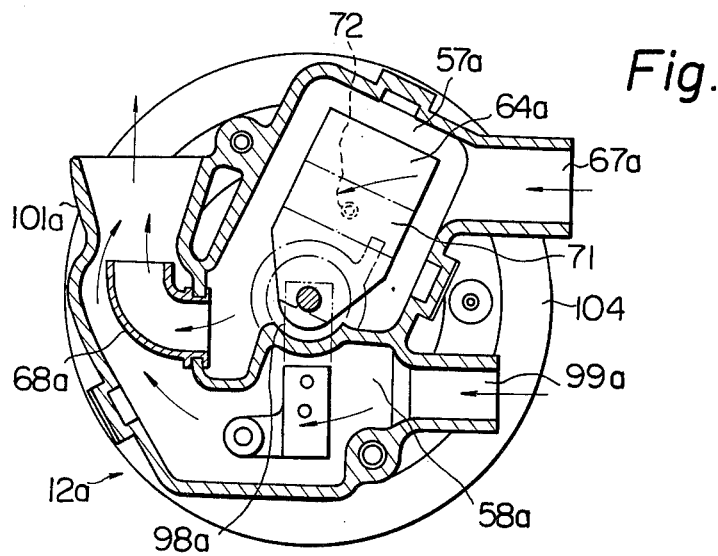
FIG. 6 is a section on a line 6—6 of FIG. 5.

FIGS. 5 and 6 illustrate another embodiment of the present actuator, in which like elements are designated by the same reference numerals and elements which correspond in function but differ in configuration are designated by the same reference numerals suffixed by the character "a".

An actuator 12a illustrated in FIGS. 5 and 6 differs from the actuator 12 in that the valve housings 52 and 53 are combined into a unitary valve housing 104. Temperature chambers 57a and 58a, rather than being axially spaced from each other, are vertically or transversely spaced from each other. In addition, bimetal springs 68a and 98a have opposite temperature characteristics. The spring 98a is similar to the spring 98 in that it expands outwardly, or leftwardly in FIG. 5, in response to an increase in temperature. The spring 68a, however, is adapted to contract inwardly, or leftwardly, in response to an increase in temperature. The general operation of the actuator 12a is similar to the actuator 12 since both springs 68a and 98a exert a leftward force on a valve element 84a. The actuator 12a is advantageous since the configuration is more compact than that of the actuator 12.

Figure 7:
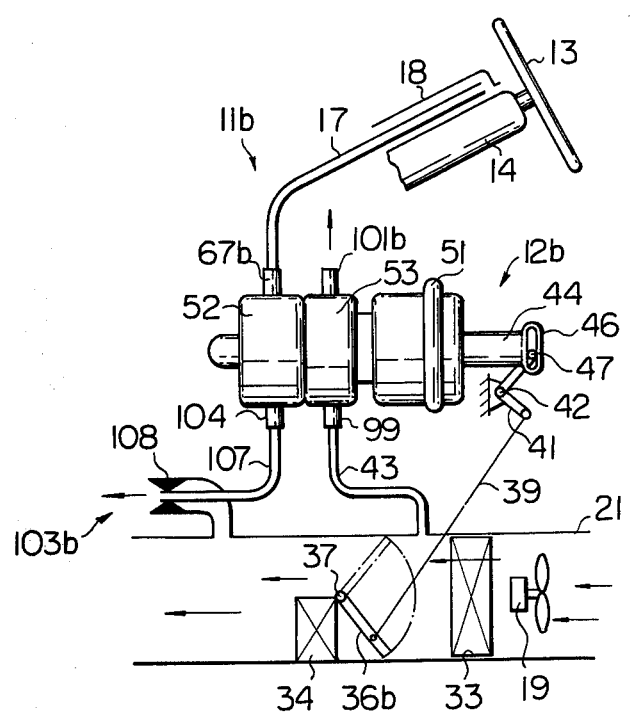
FIG. 7 is a schematic view illustrating a modification of the invention.

FIG. 7 illustrates another embodiment of the invention in which corresponding elements are designated by the same reference numerals suffixed by the character "b". A system 11b differs from the system 11 in that an aspirator 103b is provided to the duct 21 rather than to the actuator 12b. Air from the duct 21 is blown through the second temperature chamber 58 through the hose 43 as above. However, air is sucked through the first temperature chamber 57 from an outlet 106 through a hose 107. The end of the hose 107 is coaxially surrounded by a venturi tube 108 leading from the duct 21. The low pressure in the venturi tube 108 sucks air from the hose 107.

Various modifications will become possible for those skilled in the art after receiving the teachings of the present disclosure without departing from the scope thereof. For example, the location of the point where the hose 43 is connected to the duct 21 may be varied according to practical design conditions. The hose 43 may tap the duct 21 downstream of both the evaporator 33 and heater 34. Where the output of the evaporator 33 is generally stable and that of the heater 34 varies considerably due to variations in engine load and the like, the air just downstream of the heater 34 is preferably sensed and vice-versa.

What is claimed is:

1. In an air conditioning apparatus for a space including a duct opening into the space, means for forcing air through the duct into the space, air conditioning means for regulating a temperature of air passing through the duct and a control member for controlling the air conditioning means, a thermopneumatic actuator comprising:
 a housing defining therein a pressure chamber, a valve chamber, a first temperature chamber communicating with the space and a second temperature chamber communicating with the duct;
 a first diaphragm hermetically sealing the first temperature chamber from the valve chamber;
 a second diaphragm hermetically sealing the second temperature chamber from the pressure chamber, the second diaphragm being equal in area to the first diaphragm;
 aspirator means for inducing air flow from the space through the first temperature chamber.
 means for inducing air flow from the duct through the second temperature chamber;
 a power diaphragm constituting a wall of the pressure chamber, the control member being operatively connected to and positioned by the power diaphragm;
 a diaphragm spring urging the power diaphragm and thereby the control member against air pressure in the pressure chamber;
 a valve having inlets communicating with an air pressure source and the space respectively, an outlet communicating with the pressure chamber and a movable valve element operatively supported by the first and second diaphragms for controlling communication between the inlets and the outlet;
 first and second thermally deformable springs disposed in the first and second temperature chambers respectively and being mechanically connected in parallel between the housing and the valve element; and
 a valve spring connected between the valve element and the diaphragm in such a manner that a force of the valve spring opposes parallel forces of the first and second thermally deformable springs.

2. An actuator as in claim 1, in which the first and second thermally deformable springs each have a U-shape.

3. An actuator as in claim 1, in which the first and second thermally deformable springs have opposite temperature characteristics.

4. An actuator as in claim 1, in which the valve element is movable from a position in which the valve element connects the inlet which communicates with the air pressure source to the outlet through an equilibrium position in which the valve element blocks both inlets to a position in which the valve element connects the inlet which communicates with the space to the outlet.

5. An actuator as in claim 1, in which the inlet which communicates with the space communicates therewith through the first temperature chamber.

6. An actuator as in claim 1, further comprising adjustor means for adjusting a preload of the first thermally deformable spring.

7. An actuator as in claim 1, in which the air pressure source is a source of air at negative gage pressure.

8. An actuator as in claim 1, in which the aspirator means comprises a passageway connected at one end to an outlet of the first temperature chamber and venturi means coaxially surrounding an other end of the passageway, the venturi means communicating with the duct.

9. An actuator as in claim 8, in which the aspirator means is integral with the housing.

10. An actuator as in claim 8, in which the aspirator means is provided to the duct.

* * * * *